(12) United States Patent
Oh et al.

(10) Patent No.: US 8,481,611 B2
(45) Date of Patent: Jul. 9, 2013

(54) ARTIFICIAL MARBLE AND PREPARATION METHOD THEREOF

(75) Inventors: Jae Ho Oh, Seongnam-si (KR); Yang Hwan Cho, Cheongju-si (KR)

(73) Assignee: LG Chem, Ltd. (KR)

( * ) Notice: Subject to any disclaimer, the term of this patent is extended or adjusted under 35 U.S.C. 154(b) by 405 days.

(21) Appl. No.: 12/522,071

(22) PCT Filed: Dec. 29, 2007

(86) PCT No.: PCT/KR2007/007000
§ 371 (c)(1),
(2), (4) Date: Jan. 12, 2010

(87) PCT Pub. No.: WO2008/082229
PCT Pub. Date: Jul. 10, 2008

(65) Prior Publication Data
US 2010/0113645 A1 May 6, 2010

(30) Foreign Application Priority Data
Jan. 5, 2007 (KR) ........................ 10-2007-0001535

(51) Int. Cl.
*C09D 5/29* (2006.01)
(52) U.S. Cl.
USPC ........................................... 523/171
(58) Field of Classification Search
USPC ........................................... 523/171
See application file for complete search history.

(56) References Cited

U.S. PATENT DOCUMENTS
2007/0004824 A1 * 1/2007 Kim et al. ..................... 523/171

FOREIGN PATENT DOCUMENTS
| KR | 10-2000-0018882 | 4/2000 |
| KR | 10-2001-0084598 | 9/2001 |
| KR | 10-0555441 | 2/2006 |
| KR | 10-2007-0001308 | 1/2007 |

OTHER PUBLICATIONS
International Search Report—PCT/KR2007/007000 dated Apr. 16, 2008.
Written Opinion—PCT/KR2007/007000 dated Apr. 16, 2008.

* cited by examiner

*Primary Examiner* — Edward Cain
(74) *Attorney, Agent, or Firm* — Cantor Colburn LLP

(57) ABSTRACT

The present invention relates to an artificial marble comprising a base resin; and layer-separated chips containing a matrix resin and additives, all or part of said additives is present in a state forming layered-phase in said matrix resin through phase-separation by a difference of specific gravity between said additives and said matrix resin, and a method for preparing the same. In the present invention, phase-separation (layer separation) of the additives in the chip is induced by adding the additives having specific gravity different from the matrix resin constituting base of the chip to the matrix resin, and if necessary, a position of the chip in the artificial marble is controlled through high specific gravity treatment. Therefore, the present invention may provide an artificial marble having a texture close to a natural rock by embodying various effects such as pearl effect, metallic effect and 3-dimensional effect.

14 Claims, 2 Drawing Sheets

(a) (b) (c) (d)

ARTIFICIAL MARBLE AND PREPARATION METHOD THEREOF

TECHNICAL FIELD

The present invention relates to an artificial marble which comprises layer-separated chips containing a matrix resin and additives, in which at least part of said additives are present in a state forming layered-phase by a difference of specific gravity with said matrix resin, and a method for preparing the same.

BACKGROUND ART

An artificial marble is a common name of synthesized products embodying a texture of a natural rock by compounding additives such as natural stone dusts, minerals and/or resin chips to a base such as a cement or a resin, for example, an acrylic resin, an unsaturated polyester resin and/or an epoxy resin, and, if necessary, adding an additive such as a pigment.

The artificial marbles may include, as representative classes, acrylic artificial marbles, polyester artificial marbles, epoxy artificial marbles, melamine artificial marbles or engineered stone (E-stone) type artificial marbles and the like. Such artificial marbles have a beautiful appearance and an excellent workability, are lighter than natural marbles and have an excellent strength. Therefore, the artificial marbles are widely used as counter tables and various interior materials. However, hitherto known artificial marbles have embodied appearance effects through mainly combining single-colored opaque chips. There is a limit for such artificial marbles to embody patterns similar to natural marbles and granite, and the like. Therefore, many researches have been carried out to develop artificial marbles having appearance closer to natural marbles.

Korean Patent No. 376,605 discloses an artificial marble panel in which chips having different colors and specific gravities, such as low, medium and/or high specific gravity chips, are distributed in a different patterns on the surface and the back of said panel. However, the above technology had a limit to embody a texture similar to a natural rock, since it is one such that, by constituting the specific gravity of chips themselves to be different from that of a base resin of the panel, different chips each other are distributed inside the panel.

DISCLOSURE OF INVENTION

Technical Problem

The present invention relates to an artificial marble that may represent appearance close to a natural rock by variously utilizing layer-separated chips containing additives that is present therein in a state forming layered-phase so as to freely embody pearl effect, metallic effect and/or three-dimensional effect, and the like, and a method for preparing the same.

Technical Solution

The present invention provides, as means to solve the above described problems, an artificial marble comprising a base resin; and layer-separated chips containing a matrix resin and additives, at least part of said additives being present in a state forming layered-phase in said matrix resin through phase-separation by a difference of specific gravity between said additives and said matrix resin.

Layer-separated chips to be included in said artificial marble may have one or more shapes selected from the group consisting of a plate, a circle, an oval, a spherical shape, a polygon and a polyhedron.

In addition, the matrix resin of layer-separated chips to be included in the present artificial marble is one or more selected from the group consisting of an acrylic resin; a polyester resin; an epoxy resin; a polyvinyl chloride resin; a polystyrene resin; a polycarbonate resin and a styrene-methylmethacrylate copolymer resin. It is preferred that the difference of specific gravity between the additives and the matrix resin is 0.1 to 2.0.

The additives to be included in said artificial marble may be one or more selected from the group consisting of pearl, metal, natural stone dust, quartz, glass, mirror and transparent resin chips.

The present invention also provides, as other means to solve the above problems, a method for preparing an artificial marble, comprising a first step of preparing layer-separated chips comprising additives which is present in a state forming layered-phase in a matrix resin; and a second step of applying the prepared layer-separated chips to the artificial marble.

Preferably, the first step in said method of the present invention also comprises a step (1) of preparing a resin mixture by mixing the matrix resin and the additives having specific gravity different from that of said matrix resin, and then hardening the resin mixture to prepare a resin plate; and a step (2) of pulverizing said resin plate.

In addition, said step (1) in the present method may further comprise laminating a layer having high specific gravity on the prepared resin plate, wherein the layer having high specific gravity comprises, preferably, a base resin and a filler having a specific gravity of 2.5 to 10.

Advantageous Effects

In the present invention, phase-separation (layer separation) of the additives in the chip is induced by adding the additives having specific gravity different from a matrix resin constituting base of the chip to the matrix resin, and if necessary, a position of the chip in the artificial marble is controlled through high specific gravity treatment. Therefore, the present invention may provide an artificial marble having a texture close to a natural rock by embodying various effects such as pearl effect, metallic effect and three-dimensional effect.

BEST MODE FOR CARRYING OUT THE INVENTION

Figure 1:
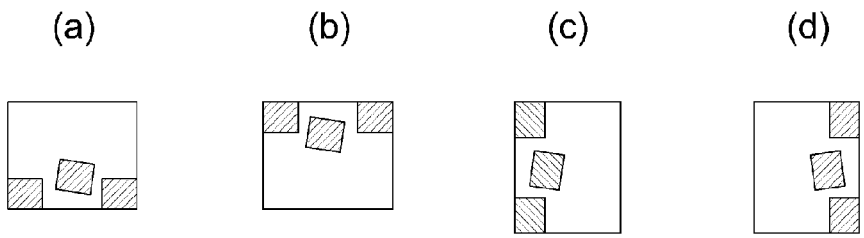
FIG. 1 is pattern diagrams depicting layer-separated chips according to one embodiment of the present invention.

The present invention relates to an artificial marble comprising a base resin; and layer-separated chips containing a matrix resin and additives, all or part of said additives being present in a state forming layered-phase in said matrix resin through phase-separation by a difference of specific gravity between the additives and said matrix resin. The present invention may provide an artificial marble embodying appearance effects closer to a natural rock by using layer-separated chips, in which all or part of additives are forming layer (layered-phase) in a matrix resin by a difference of specific gravity.

Hereinafter, the artificial marble of the present invention is explained in detail.

Specific kinds of base resins, which may be used in the artificial marble of the present invention, are not particularly limited. That is, base resins, which are used in preparing various artificial marbles known in this field, such as acrylic artificial marbles, polyester artificial marbles, epoxy artificial marbles, melamine artificial marbles and E-stone type artificial marbles, may be used without limitation. The term "E-stone" as used above means an artificial marble comprising natural stone dust, quartz, glass, mirror and aluminum hydroxide as main components, and 10% by weight or less of a resin component.

Examples of such base resins which are usable herein may include one or more selected from the group consisting of an acrylic resin, an unsaturated polyester resin, an epoxy resin and a melamine resin.

Specific kinds of said acrylic resin are not particularly limited. For example, a polymer of one or more acrylic monomers selected from the group consisting of methyl (meth)acrylate, ethyl (meth)acrylate, butyl (meth)acrylate, 2-ethylhexyl (meth)acrylate, benzyl (meth)acrylate and glycidyl (meth)acrylate may be used.

Kinds of said unsaturated polyester resins are also not particularly limited. For example, a polyester resin having an acid value of 5 to 40 and a weight average molecular weight of 1,000 to 5,000, which is prepared through a condensation reaction of an, -unsaturated dibasic acid or a mixture of said dibasic acid and saturated dibasic acid with a polyhydric alcohol, may be used. At this time, the process for preparing said polyester resin is not particularly limited. For example, it may be prepared by a method which comprises a step of mixing said dibasic acid and the like with said polyhydric alcohol in a specific ratio (for example, moles of alcoholic hydroxide group/moles of carboxylic group=0.8 to 1.2), subjecting said mixture to a condensation reaction at a temperature of 140 to 250? under an inert gas flow such as carbon dioxide gas and/or nitrogen gas with removing resulting water and slowly increasing the temperature depending on degree of proceeding the reaction.

Examples of, -unsaturated dibasic acids or saturated dibasic acids as used above may include maleic anhydride, citraconic acid, fumaric acid, itaconic acid, phthalic acid, phthalic anhydride, isophthalic acid, terephthalic acid, succinic acid, adipic acid, sebasic acid and/or tetrahydrophthalic acid, and the like. Examples of polyhydric alcohols may include ethylene glycol, diethylene glycol, triethylene glycol, propylene glycol, dipropylene glycol, tripropylene glycol, polypropylene glycol, 1,3-butylene glycol, hydrogenated bisphenol A, trimethylol propane monoarylether, neopentyl glycol, 2,2,4-trimethyl-1,3-pentanediol and/or glycerine, and the like. If necessary, said polyester resin may further comprise a monobasic acid such as acrylic acid, propionic acid and/or benzoic acid; or polybasic acid such as trimellitic acid and/or benzene tetracarboxylic acid.

In addition, kinds of usable epoxy resins above are also not particularly limited. For example, a bifunctional or multifunctional epoxy resin may be used. Examples of said bifunctional or multifunctional epoxy resins may include one or more selected from the group consisting of a bisphenol A epoxy resin, a bisphenol S epoxy resin, a tetraphenyl ethane epoxy resin and a phenol novolac epoxy resin.

Figure 2:
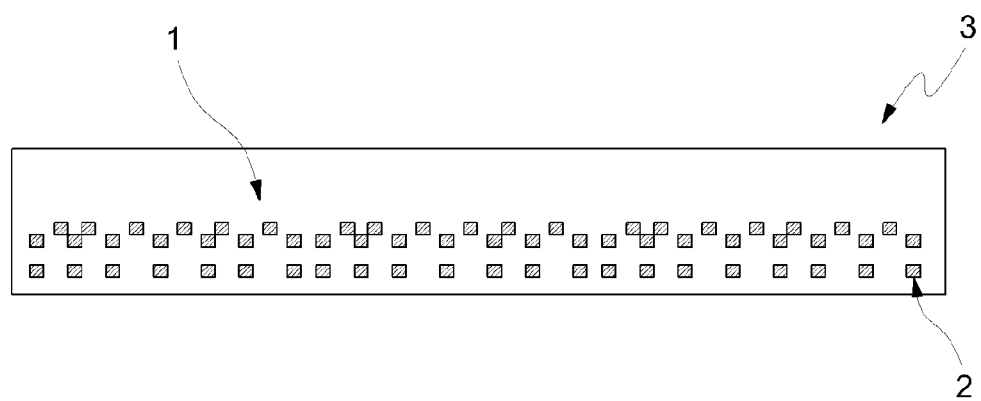
FIG. 2 is a pattern diagram depicting a state of a resin plate before pulverization for preparing layer-separated chips.

The present artificial marble is characterized by comprising layer-separated chips together with the above base resin. The term layer-separated chips as used herein means chips which comprise a matrix resin and additives having specific gravity different from said matrix resin, and therefore all or part of said additives are phase-separated in a state of floating or sinking in said matrix resin so as to form homogeneous layered-phase. One aspect of such layer-separated chips is shown in the attached FIG. 1. Such layer-separated chips may be prepared by hardening a mixture of the matrix resin and the additives to prepare a resin plate 3 as shown in FIG. 2 and then pulverizing said plate 3. For example, when the additives 2 having higher specific gravity than that of the matrix resin 1 is added, the additives 2 relatively heavier than said resin 1 sinks in the resin 1 before hardening and then are present in a state that the additives phase is separated from the base phase (the matrix resin). Here, by hardening the mixture in a state that the phase separation (layer separation) is derived so that the additives 2 form homogeneous layered-phase therein by optimizing the difference of specific gravity between said additives 2 and said matrix resin 1, the resin plate 3 as shown in FIG. 2 may be prepared. Then, by pulverizing the above resin plate 3, layer-separated chips may be prepared, wherein the additives form layered-phase in upper side, lower side, right side or left side in the chip, as shown in FIG. 1. The shape of pulverized chips is not particularly limited and may have any shape such as a plate, a circle, an oval, a spherical shape, a polygon and/or a polyhedron. But, in view of workability, the plate shape is preferable.

Kinds of usable matrix resins in preparing said layer-separated chips are not particularly limited. For example, various resins known in this field, such as an acrylic resin; an (unsaturated) polyester resin, for example, a polyethylene terephthalate (PET) resin; an epoxy resin; a polyvinyl chloride (PVC) resin; a polystyrene (PS) resin; a polycarbonate (PC) resin; and/or a styrene-alkyl(meth)acrylate copolymer resin, for example a styrene-methylmethacrylate copolymer (SMMA), may be used without limitation. Without being particularly limited, it is preferred to use high molecular weight resins having transparency such as an acrylic resin(for example, poly(methyl(meth)acrylate (PMMA)) and/or a polyester resin(for example, a PET resin), and the like.

Kinds of the additives included in the above matrix resin are also particularly limited. But, it is preferred to use an additive having a difference, of specific gravity between the matrix resin and the additive, of 0.1 to 2.0. If said difference in the specific gravity is less than 0.1, it is apprehended that the layer separation phenomenon of additive in the resin is not occurred. If it is more than 2.0, it is apprehended that the undesired separation phenomenon and/or the aggregation phenomenon is occurred inside chips. Examples of these additives may include one or more selected from the group consisting of pearl, metal, natural stone dust, quartz, glass, minor and transparent resin chips. But, any additive may be used as long as the difference in the specific gravity with the matrix resin falls in the above range. It is preferred that such additives are included in an amount of 0.1 to 5 parts by weight relative to 100 parts by weight of the matrix resin. If said amount is less than 0.1 parts by weight, it is apprehended that the sparkling effect is lowered. If it is in excess of 5 parts by weight, it is apprehended that the poor workability is occurred due to an increase in viscosity.

The present artificial marble may also suitably comprise one or more additives selected from the group consisting of an inorganic filler, a cross-linking agent, a cross-linking accelerator and a pigment, in addition to the above described components.

Specific kinds of the inorganic fillers above are not particularly limited. Any one may be used as long as they are usually used in preparing artificial marbles. Examples of these inorganic fillers may include one or more selected from the group consisting of calcium carbonate, silica, metal hydroxide and alumina. Without being particularly limited, it is preferred that said inorganic filler has a particle size of 10 to 200 μm. If the particle size is less than 10 μm, it is apprehended that the light transmission performance of artificial marble is lowered. If it is in excess of 200 μm, it is apprehended that the physical property of artificial marble is lowered. In addition, it is preferred that said inorganic filler is included in an amount of 0 to 500 parts by weight relative to 100 parts by weight of the base resin. However, the above amount is merely one aspect of the present invention. For example, when the additive such as pearl is used in preparing an artificial marble, the transparent resin may be also cured as such, without adding any inorganic filler.

Kinds of the cross-linking agents are also not particularly limited. Any one may be used as long as they have copolymerizable double bonds so as to form crosslinking bond with the base resin such as the above described acrylic resin and/or polyester resin. Examples of such cross-linking agents may include multifunctional acrylic monomers, and more specifically include one or more selected from the group consisting of ethylene glycol di(meth)acrylate (EDMA), diethylene glycol di(meth)acrylate (2EDMA), triethylene glycol di(meth)acrylate (3EDMA), tetraethylene glycol di(meth)acrylate (4EDMA), trimethylolpropane tri(meth)acrylate (TMPMA), 1,6-hexanediol di(meth)acrylate, polybutylene glycol di(meth)acrylate and neopentyl glycol di(meth)acrylate. It is more preferred herein to use trimethylolpropane tri(meth)acrylate (TMPMA) and/or ethylene glycol di(meth)acrylate (EDMA) and the like, among these. But, it is not limited thereto. In addition, it is preferred that said cross-linking agent is included in an amount of 0.2 to 5 parts by weight, relative to 100 parts by weight of the base resin. If said amount is less than 0.2 parts by weight, it is apprehended to cause generation of unevenness on surfaces of artificial marbles, generation of bubbles on the upper and bottom parts, or lowering of physical properties such as bonding strength between raw materials, heat resistance and/or thermal discoloration resistance. In addition, if the amount is in excess of 5 parts by weight, it is apprehended that patterns of artificial marbles are lowered due to phase separation of the chips.

The cross-linking accelerator may serve to promote polymerization and hardening reactions of the resin composition in preparing the artificial marble. Kinds of such cross-linking accelerator may include organic peroxides, and, more particularly include one or more selected from the group consisting of diacyl peroxides such as benzoyl peroxide or dicumyl peroxide; hydroperoxides such as butyl hydroperoxide or cumyl hydroperoxide; t-butylperoxy maleic acid; t-butyl hydroperoxide; t-butylhydroperoxy butylate; acetyl peroxide; lauroyl peroxide; azobisisobutyronitrile; azobisdimethylvaleronitrile; t-butylperoxy neodecanoate; and t-amylperoxy-2-ethyl hexanoate. It is preferred herein to use t-butylhydroperoxy butylate and/or benzoyl peroxide and the like, among these. If necessary, polymerization and hardening may be carried out at room temperature by using a mixture of amine peroxide and sulfonic acid; or a mixture of a peroxide and a cobalt compound. But, it is not limited thereto. It is preferred that the amount of such cross-linking accelerator is 0.2 to 3 parts by weight relative to 100 parts by weight of the base resin. If said amount is less than 0.2 parts by weight, it is apprehended that the hardening rate is slowed or sufficient hardening is not carried out. If the amount is in excess of 3 parts by weight, it is apprehended that the hardening rate is rather delayed or partial non-hardening is caused.

The present invention can provide an artificial marble having a texture close to a natural rock by variously utilizing each component as described above, especially layer-separated chips and therefore embodying various effects such as pearl effect, metallic effect and/or three-dimensional effect, without any further treatment to the artificial marble.

One embodiment of the present artificial marbles is explained below, with reference to the attached drawings.

Figure 3:
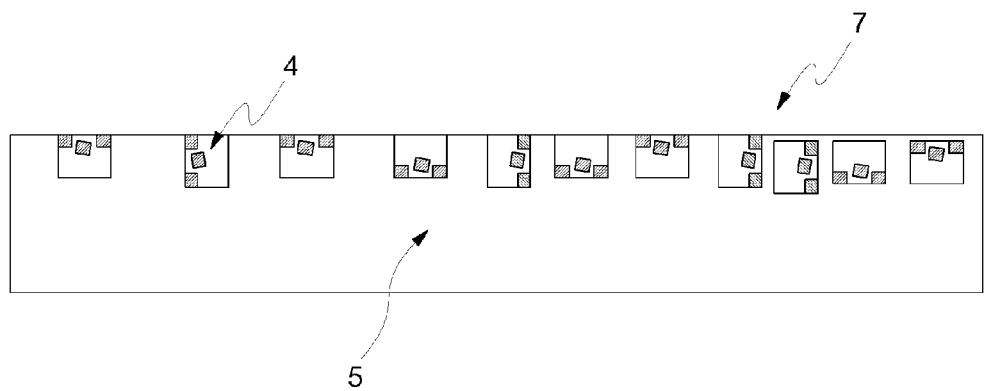
FIG. 3 is a pattern diagram depicting the artificial marble according to one embodiment of the present invention.

First, the present invention may embody various and natural three-dimensional effects as shown in FIG. 3 by applying the layer-separated chips as it is to the artificial marble, without performing any further treatment thereto. That is, since the layer-separated chips 4 without any further treatment are present randomly without specific direction in the base resin 5, the layer formed by additives inside the chips 4 is arrayed in vertical, horizontal or other directions, so that natural three-dimensional effect may be embodied.

Figure 4:
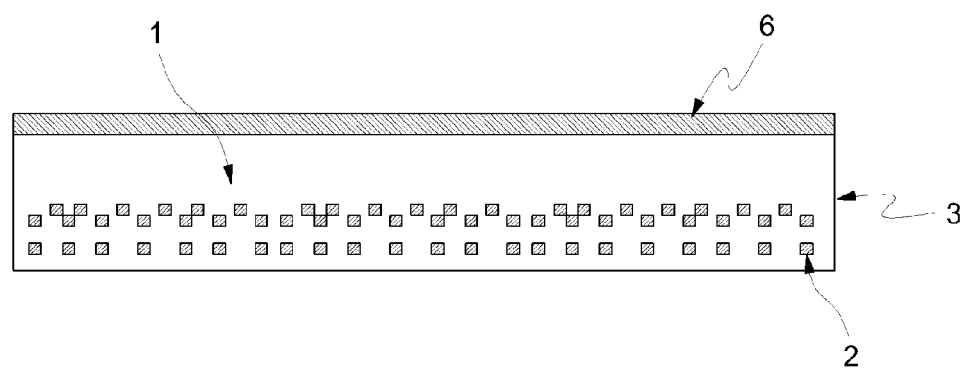
FIG. 4 is a pattern diagram depicting a state of the resin plate of FIG. 2 on which a layer having high specific gravity layer is formed.

In the present invention, said layer-separated chips may be also constituted so that they are arrayed in a state having specific direction in the base resin by subjecting them to a high specific gravity treatment. The methods for carrying out such treatment are not particularly limited. For example, this treatment may be carried out by forming high specific gravity layer 6 on one or both sides of the resin plate 3 before pulverization, as shown in the FIG. 4. In the case of using the chips prepared by pulverizing the resin plate comprising the high specific gravity layer 6 thereon, the chips are arrayed uniformly without separation phenomenon, since the chips have almost same specific gravity with the basis region (base resin). Therefore, the chips are regularly present in a state that a surface, on which the high specific gravity layer 6 is formed, is directed downward in the artificial marble.

Figure 5:
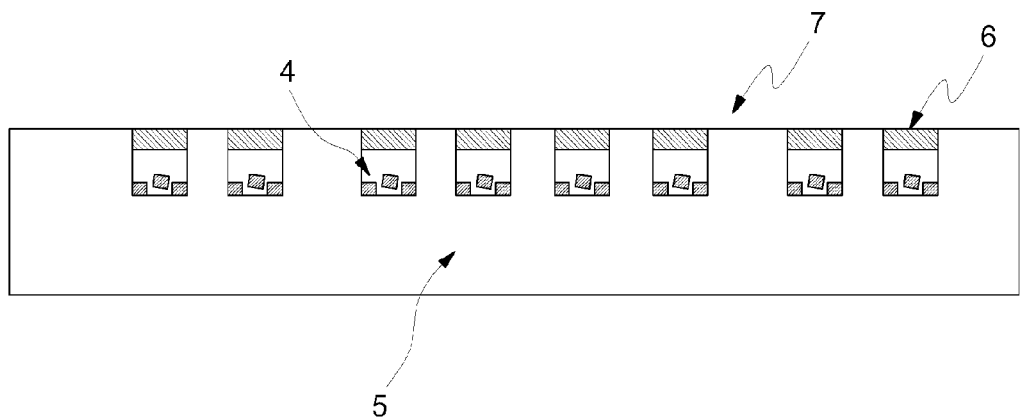
FIG. 5 is a pattern diagram depicting one embodiment of the artificial marble comprising layer-separated chips on which a high specific gravity layer is formed.
Figure 6:
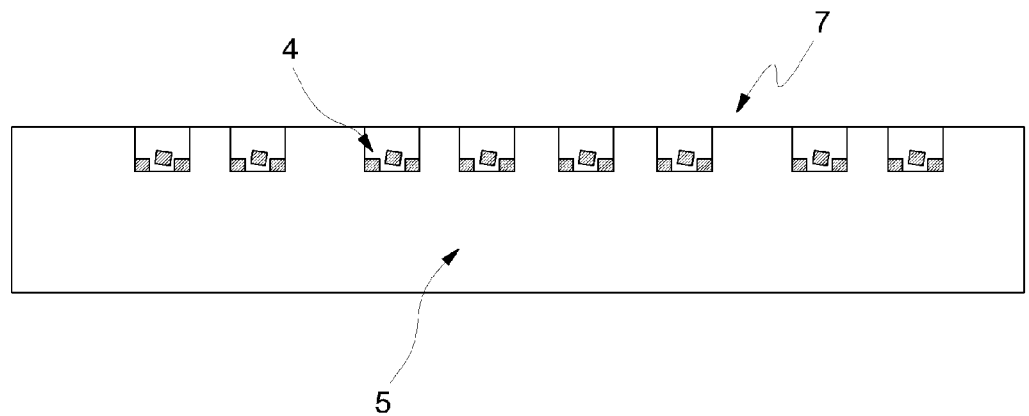
FIG. 6 is a pattern diagram depicting a state that a sanding treatment is subjected to the artificial marble of FIG. 5.

In addition, it is also possible to array all of the chips 4 toward the surface of the artificial marble 7 (refer to FIGS. 5 and 6) by controlling the specific gravity of the layer-separated chips 4 such that it is substantially higher than the specific gravity of the basis region (base resin) 5. More specifically, on preparing the artificial marble 7, layer-separated chips which are treated with high specific gravity layer 6 so as to have substantially higher specific gravity than a base resin 5 are added into a composition constituting the base resin 5. In this case, since the specific gravity of the chips is higher than that of the composition for hardening and the weight of the chips is almost concentrated on the layer 6, the chips sink into the bottom of the composition for hardening and then are distributed in a state that the direction, of which the high specific gravity layer is formed, is toward the bottom (that is, the surface of the artificial marble 7). When the hardening process is carried out with maintaining the above state, the hardened composition is prepared in a state that the high specific gravity layer 6 is in contact with the bottom of the composition for hardening (surface of artificial marble), as shown in the attached FIG. 5. Then, after surface treating processes such as sanding, the artificial marble as shown in FIG. 6 may be prepared. At this time, by controlling the laminating direction of the high specific gravity layer in the resin plate, any position of layered-phase formed by the additives in the chips may be also controlled. For example, if the high specific gravity layer 6 is formed in the opposite direction to the layered-phase of additive in the resin plate 3, the layered-phase is recognized in a state that the layered-phase is entered inside from the surface of the prepared artificial marble 7, so that a natural sense of depth may be embodied. That is, by various changing positions of the high specific gravity layer, appearance effects having a texture more similar to natural rock may be embodied herein.

The present invention also relates to a method for preparing an artificial marble which comprises:

a first step of preparing layer-separated chips comprising additives which are present in a state forming layered-phase in a matrix resin; and a second step of applying the prepared layer-separated chips to the artificial marble.

The first step of the present invention is a step of preparing layer-separated chips by using a matrix resin and additive having a specific gravity different from the matrix resin.

The method for preparing such layer-separated chips is not particularly limited. For example, they may be prepared by a method which comprises a step (1) of preparing a resin mixture by mixing the matrix resin and the additives having specific gravity different from the matrix resin, and then hardening the resin mixture to prepare a resin plate; and (2) a step of pulverizing said resin plate.

In said step (1), the resin plate is prepared by hardening the mixture of the matrix resin and the additives in a state that, by controlling specific gravity of the matrix resin and the additive, all or part of the additives float or sink homogeneously in the mixture so as to form a uniform layered-phase (layer separation). Also, in the following step (2), the layer-separated chips may be prepared by pulverizing the prepared resin plate through the means known in the field.

In addition, the step (1) may further comprise a step of subjecting the resin plate before pulverization to a high specific gravity treatment. A method for carrying out such treatments is not particularly limited. For example, it may be carried out by laminating a layer with high specific gravity (high specific gravity layer) on the resin plate using a resin mixture, for forming the layer with high specific gravity, which comprises a base resin and filler.

At this time, kinds of the base resins are not particularly limited. For example, an acrylic resin, an unsaturated polyester resin such as a PET resin, an epoxy resin, a polyvinyl chloride (PVC) resin, a polystyrene (PS) resin, a polycarbonate (PC) resin and/or a styrene-methyl(meth)acrylate copolymer resin, and the like may be used. Without being particularly limited, it is preferred to use transparent resins such as an acrylic resin (for example, poly(methyl(meth)acrylate)) and/or a polyester resin (for example, a PET resin), and the like, on forming the layer with high specific gravity.

In addition, it is preferred that a filler included in said layer with high specific gravity has a specific gravity of 2.5 to 10. If said specific gravity is less than 2.5, it is apprehended that the effect of treating with high specific gravity layer is not shown. If it is in excess of 10, it is apprehended that the workability is lowered. An example of such filler may include an inorganic powder such as barium, light calcium carbonate, stone dust, silica, titanium dioxide, aluminum hydroxide, calcium carbonate, a metal powder and/or a metal salt. But, it is not particularly limited, as long as its specific gravity is within the above described range.

A method for laminating the layer with high specific gravity as above on the resin plain plate is not particularly limited. However, in view of increasing a use efficiency of chips, it is preferred to use a crunch method or a lamination method and the like.

The second step of the present invention is a step of preparing an artificial marble by applying the layer-separated chips as prepared above. At this time, the method for preparing the artificial marble is not particularly limited. It may be prepared by general methods in this field using the above describe base resin and layer-separated chips.

In addition, in case of carrying out the high specific gravity treatment, the high specific gravity layer may be removed through a surface treatment such as sanding, which is carried out as a finishing process, to expose the transparent surface of the layer-separated chips on the surface of artificial marble, whereby the unique appearance effects with the transparent layer may be also embodied.

The invention claimed is:

1. An artificial marble comprising
a base resin; and
layer-separated chips containing a matrix resin and additives, all or part of said additives being present in a state forming layered-phase in said matrix resin through phase-separation by a difference of specific gravity between said additives and said matrix resin,
wherein the additive is one or more selected from the group consisting of pearl, natural stone dust, quartz, glass and mirror.

2. The artificial marble of claim 1, wherein the base resin is one or more selected from the group consisting of an acrylic resin, an unsaturated polyester resin, an epoxy resin and a melamine resin.

3. The artificial marble of claim 1, wherein the layer-separated chips have one or more shape(s) selected from the group consisting of a plate, a circle, an oval, a spherical shape, a polygon and a polyhedron.

4. The artificial marble of claim 1, wherein the matrix resin is one or more selected from the group consisting of an acrylic resin; a polyester; an epoxy resin; a poly(vinyl chloride); a polystyrene; a polycarbonate and a styrene-methylmethacrylate copolymer.

5. The artificial marble of claim 1, wherein the difference of specific gravity between the additive and the matrix resin is 0.1 to 2.0.

6. The artificial marble of claim 1, wherein the additive is included in an amount of 0.1 to 5 parts by weight relative to 100 parts by weight of the matrix resin.

7. The artificial marble of claim 1, further comprising one or more selected from the group consisting of an inorganic filler, a cross-linking agent, a cross-linking accelerator and a pigment.

8. The artificial marble of claim 7, wherein the inorganic filler is one or more selected from the group consisting of calcium carbonate, silica, metal hydroxide and alumina.

9. The artificial marble of claim 7, wherein the cross-linking agent is a multi-functional acrylic monomer.

10. The artificial marble of claim 7, wherein the cross-linking accelerator is an organic peroxide.

11. A method for preparing an artificial marble, comprising:
first step of preparing layer-separated chips comprising additives which are present in a state forming layered-phase in a matrix resin, wherein the additive is one or more selected from the group consisting of pearl, natural stone dust, quartz, glass and mirror; and a second step of applying the prepared layer-separated chips to the artificial marble.

12. The method of claim 11, wherein the first step comprises:
a step (1) of preparing a resin mixture by mixing the matrix resin and the additives having specific gravity different from that of said matrix resin, and then hardening the resin mixture so as to prepare resin plate; and
a step (2) of pulverizing the prepared resin plate.

13. The method of claim 12, wherein the step (1) further comprises a step of laminating a layer having high specific gravity on the prepared resin plate.

14. The method of claim 13, wherein the layer having high specific gravity comprises a base resin and a filler having specific gravity of 2.5 to 10.

* * * * *